Oct. 4, 1960 C. E. KERR 2,954,806
FILLING MECHANISM WITH VALVE MEANS
Filed March 21, 1957 4 Sheets-Sheet 1
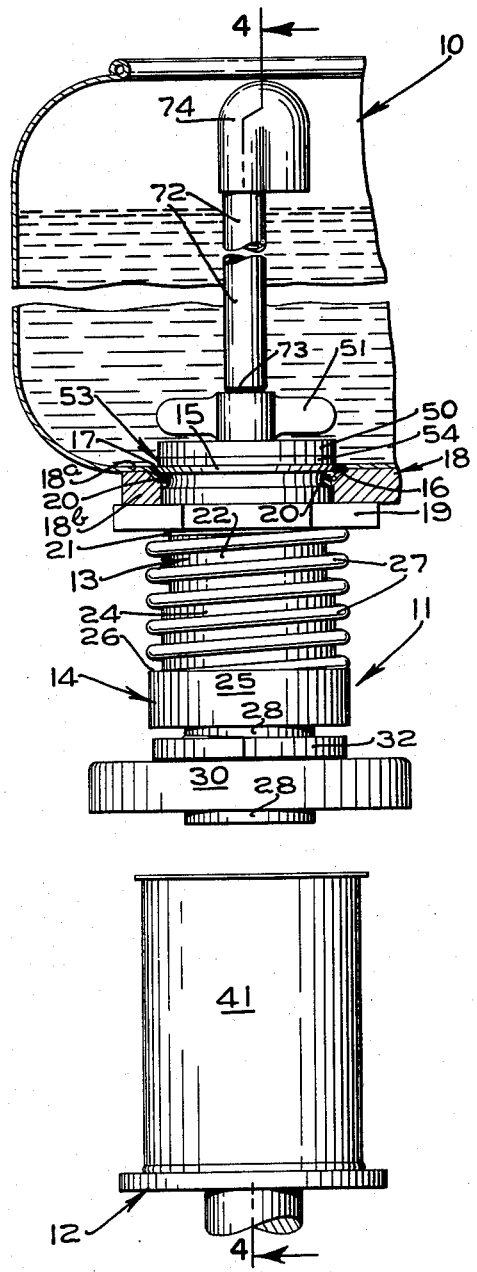
FIG_1
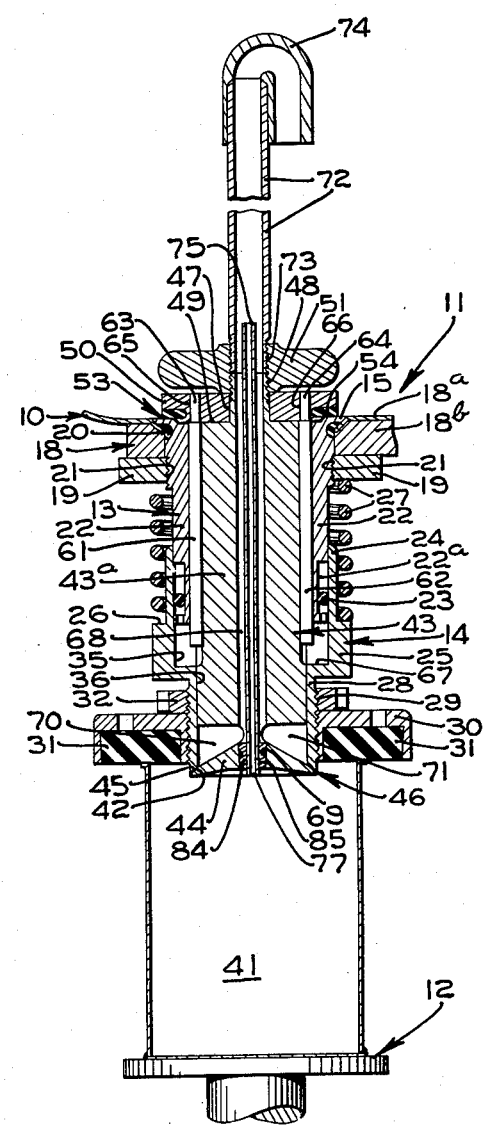
FIG_2
INVENTOR
CHARLES E. KERR
BY Hans G. Hoffmeister
ATTORNEY

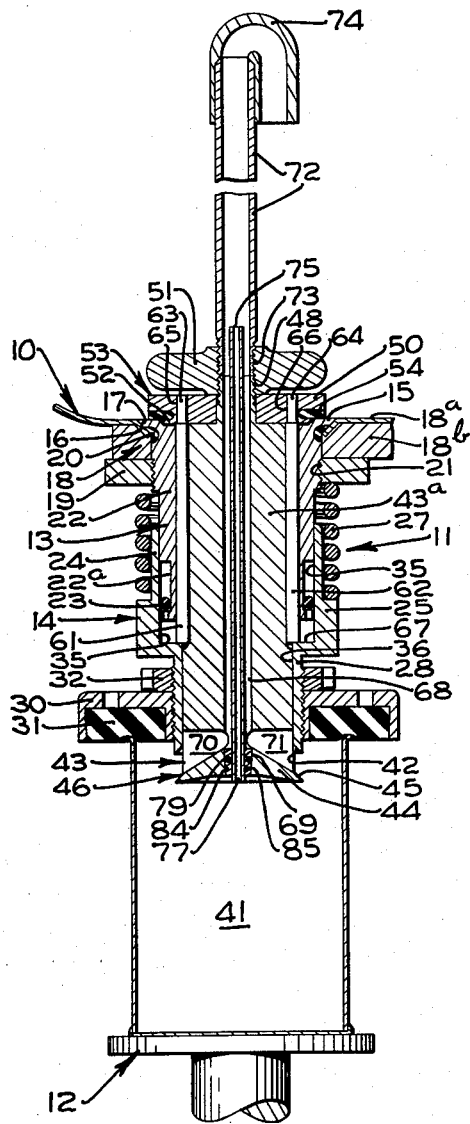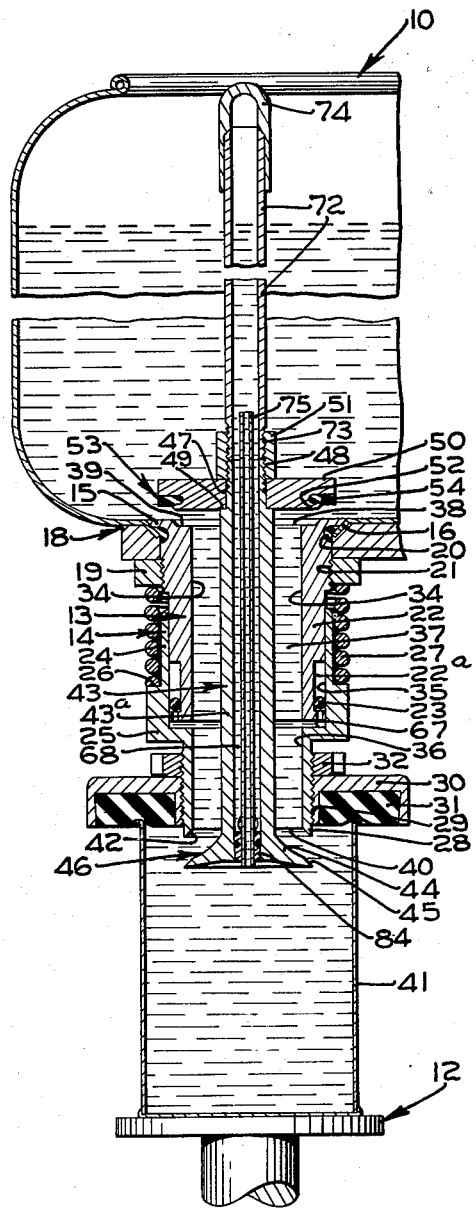

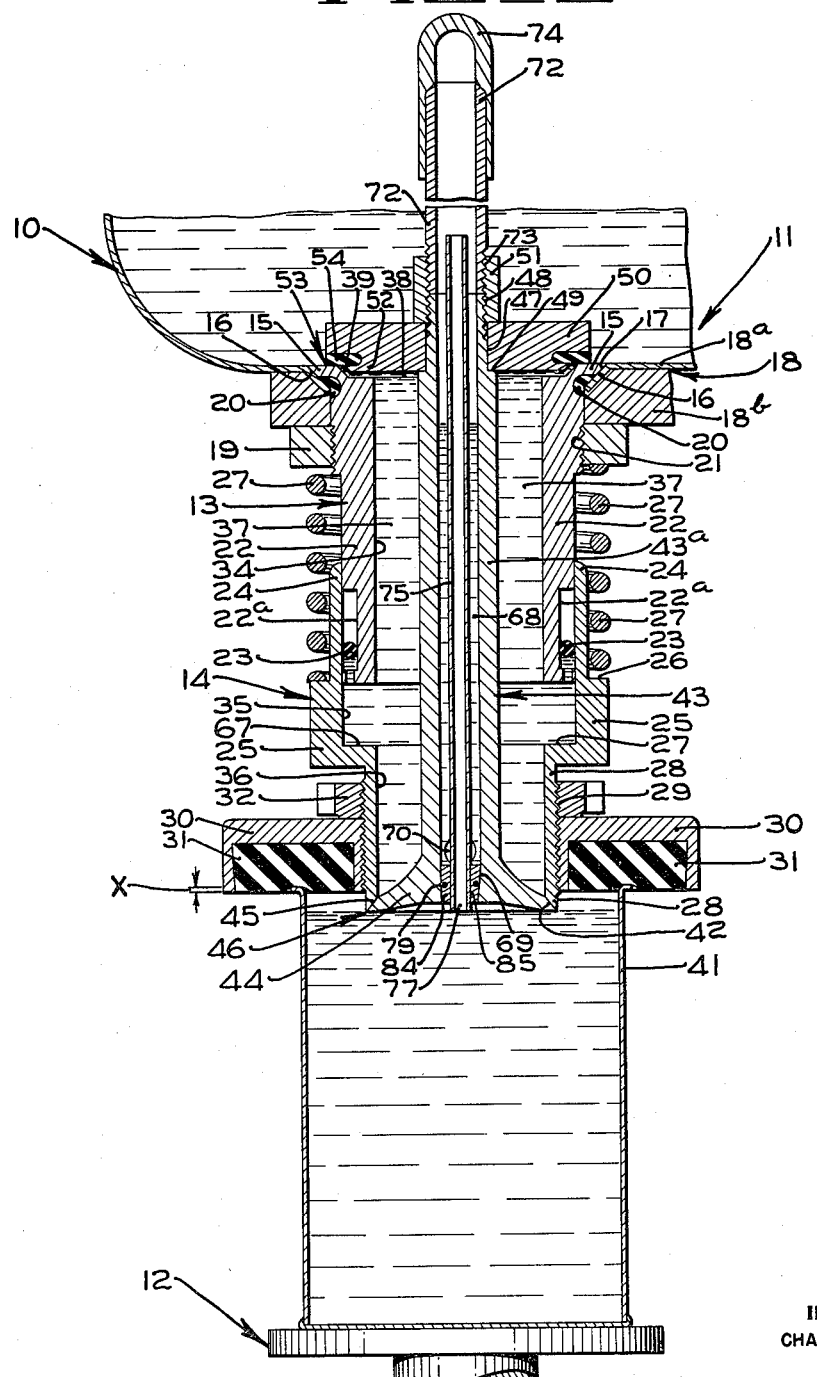

Oct. 4, 1960
C. E. KERR
2,954,806
FILLING MECHANISM WITH VALVE MEANS
Filed March 21, 1957
4 Sheets-Sheet 4
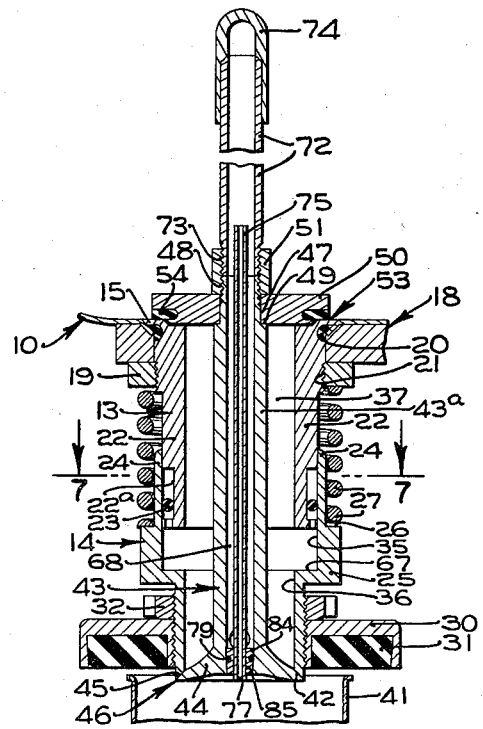
FIG_6
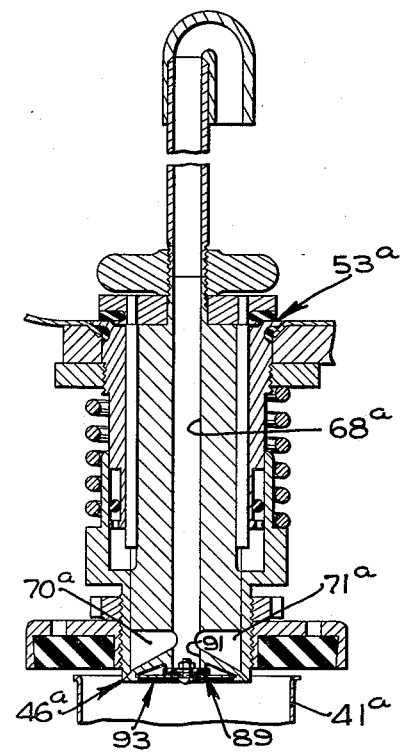
FIG_8
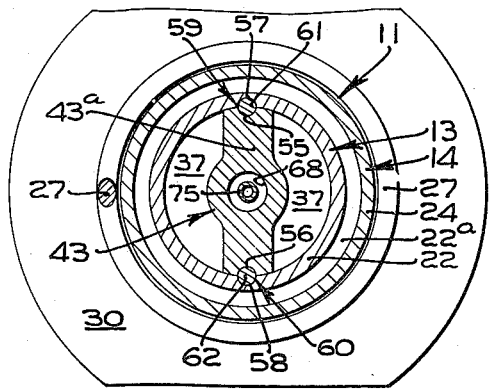
FIG_7
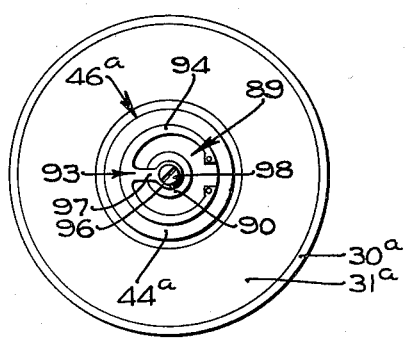
FIG_9
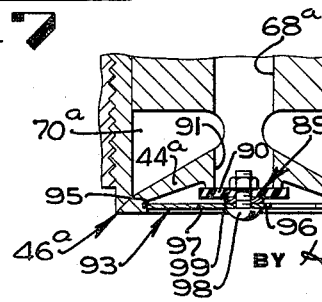
FIG_10
INVENTOR
CHARLES E. KERR
BY Hans G. Hoffmeister
ATTORNEY United States Patent Office 2,954,806
Patented Oct. 4, 1960

2,954,806

FILLING MECHANISM WITH VALVE MEANS

Charles E. Kerr, Hoopeston, Ill., assignor to Food Machinery and Chemical Corporation, San Jose, Calif., a corporation of Delaware Filed Mar. 21, 1957, Ser. No. 647,526

11 Claims. (Cl. 141—275)

The present invention appertains to liquid filling machines, and more particularly to a filling mechanism for filling liquid into wide mouth containers.

An object of the present invention is to provide a filling mechanism which reduces foaming of the liquid in the containers and also enables the containers to be readily removed at the end of the filling operation.

Another object of the present invention is to provide a filling mechanism that minimizes the spilling and dripping of liquid during and upon completion of the filling operation.

Another object of the present invention is to provide an improved filling mechanism for liquid filling machines which is capable of attaining high speeds in filling.

Another object is to provide a filling mechanism having improved venting means capable of effecting the withdrawal of air from the container during filling, and capable of breaking any vacuum created in the head space of the container.

Other objects and advantages of the present invention will become apparent from the following description and drawings in which:

Fig. 1 is a side elevation of the filling mechanism of the present invention, which is illustrated in conjunction with a container to be filled and a portion of a filling machine which is shown in section.

Fig. 2 is a longitudinal vertical section taken centrally through the filling mechanism shown in Fig. 1, which filling mechanism is shown with its inlet and outlet valves in the closed position prior to the commencement of the filling operation.

Fig. 3 is a view similar to Fig. 2 with the outlet valve disposed in open position and the inlet valve disposed in closed position.

Fig. 4 is a vertical section through the filling mechanism taken along line 4—4 of Fig. 1, said section being displaced 90° from the section shown in Figs. 2 and 3 and illustrating both the inlet and outlet valves in open position.

Fig. 5 is an enlarged section similar to Fig. 4 with the inlet and outlet valves being shown in closed position.

Fig. 6 is a view similar to Fig. 4 with the inlet and outlet valves being shown in closed position and the filled can in a lowered position subsequent to the completion of the filling operation.

Fig. 7 is an enlarged fragmentary horizontal section taken along line 7—7 of Fig. 6.

Fig. 8 is a longitudinal section through a filling mechanism, similar to the one shown in Figs. 1–7, and showing a modification of the vacuum releasing arrangement.

Fig. 9 is a bottom plan of the filling mechanism shown in Fig. 8.

Fig. 10 is an enlarged fragmentary section of a portion of Fig. 8, illustrating the vacuum releasing arrangement.

The filling machine partially illustrated herein comprises a supply tank or reservoir 10 (Fig. 1), a filling mechanism 11, and a vertically movable container table or support 12 disposed beneath the filling mechanism in vertical alignment therewith. It is to be understood that a plurality of filling mechanisms 11 are arranged in spaced relation on the tank 10 adjacent the periphery thereof and that an equal number of container supports is employed in connection therewith, as is well known in the art.

In Figs. 1–6, inclusive, the filling mechanism 11 comprises an upper stationary tubular body 13 and a lower tubular body 14 which is slidably disposed on the upper body. The upper body 13 is provided at its upper end with a flange 15 having a tapered annular sealing surface 16 which fits snugly into a complementary tapered aperture 17 of a bottom wall 18 of the tank 10. The bottom wall 18 includes an upper liner 18a and a lower support plate 18b. Adjacent the lower surface of the bottom wall 18 of the tank, the body 13 includes a threaded portion 21, which receives a lock nut 19 rigidly securing the body to the bottom wall 18 of the tank 10. Liquid tight sealing engagement is maintained between the bottom wall 18 and the body 13 by an O-ring 20, which is disposed adjacent the flange 15 and in engagement with the bottom wall 18 of the tank 10. Below the threaded portion 21, the body 13 has a portion 22 of reduced diameter having an annular recess 22a adjacent the lower end thereof.

The lower body 14 is moved with respect to the reduced diameter portion 22 of the upper body 13 and a liquid tight seal is established therebetween by means of a rolling ring seal 23 compressed between the bodies 13 and 14 within the annular recess 22a. The body 14 comprises an upper portion 24 having an outer diameter approximately equal to the diameter of the threaded portion 21 of the upper body 13 and a central portion 25 having an increased diameter to provide an annular shoulder 26. Disposed between the shoulder 26 of the lower body 14 and the lock nut 19 is a coil spring 27, which urges the movable body 14 in an axially downward direction relative to the stationary body 13. The lowermost end of the body 14 includes a reduced diameter portion 28 which has exterior threads 29. Secured to the threaded portion 29 is an adjustable lift plate 30 within which a resilient sealing ring or gasket 31 is mounted on the lower side thereof. The lift plate 30 is locked in adjusted position on the lower body 14 by means of a lock nut 32, and when raised, the plate 30 urges the movable body 14 in an axially upward direction relative to the stationary body against the resiliency of the coil spring 27.

The upper body 13 has a cylindrical bore 34 (Fig. 4) and the lower body 14 has a cylindrical bore 35 at the upper portion thereof. At the lower portion of the lower body 14 is a cylindrical bore 36, which has a reduced diameter and cooperates with bore 35 to form an inner shoulder 67. The bores 34, 35 and 36 are in communication and constitute an expansible valve chamber 37. The opening at the upper portion of the bore 34 of the body 13 establishes an inlet port 38 for admitting liquid from the tank 10 to the valve chamber 37, and disposed adjacent the inlet port 38 is a recess 39. The open ended bore 36 of the lower body 14 forms an outlet port 40 for discharging the liquid from the valve chamber 37 into a container, such as container 41. The lowermost portion 28 of the lower body 14 includes a frusto-conical valve seat 42, which is disposed adjacent the outer port 40.

For controlling the flow of liquid through the filling valve chamber 37, a duplex valve 43 is provided which comprises a core or stem 43a. The stem 43a is generally rectangular in cross-section, as seen in Fig. 7, and includes at its lower end an outlet valve head 44 (Fig. 4) which is formed as an integral part of the stem 43a. The valve head 44 is provided with a frusto-conical portion 45 adapted to seat within the frusto-conical valve seat 42 in liquid tight engagement therewith. The valve head 44 and the valve seat 42 forms an outlet valve 46 for controlling the discharge of liquid from the chamber 37.

At the upper end of the stem 43a, a reduced diameter portion 47 is provided to form a shoulder 49 upon which an annular top cap or inlet valve head 50 is seated. The upper valve head 50 is retained in adjusted position by a wing nut 51 which is in threaded engagement with a threaded section 48 of the reduced diameter portion 47. The valve head 50 has a lower tapered portion 52 adapted to extend into the recess 39. To form an inlet valve 53 for controlling the admittance of liquid from the tank 10 through inlet port 38 to the chamber 37, a rubber seal ring 54 is disposed in a recess in the outer edge of the valve head 50 and is adaptable for sealing engagement with the upper surface of the flange 15 of the body 13.

The valve stem 43a (Fig. 7) has a cross sectional area of sufficient length to engage diametrically opposing surfaces of the wall of the chamber 37. At the chamber engaging surfaces, the valve stem 43a comprises two vertically disposed longitudinally extending grooves 55 and 56 having semi-circular cross sectional areas which cooperate with two complementary, vertically disposed longitudinally extending semi-circular grooves 57 and 58, respectively, of the stationary body 13 to form two diametrically opposed keyways 59 and 60 in the inner wall of the chamber 37. Received by the keyways 59 and 60 are two keying and lifting rods 61 and 62, which have decreased diameter portions 63 and 64, respectively (Fig. 2), press fitted within apertures 65 and 66, respectively, of the upper valve head 50.

The upper and lower body members 13 and 14 are normally held in extended position under the action of the coil spring 27, as shown in Fig. 2, so that the inlet and outlet valves 53 and 46 are in closed position. In the closed position of both valves, the seal ring 54 of the upper valve head 50 is seated on the flange 15 and the lower valve head 44 is seated on the lower valve seat 42.

When the lift plate 30 and the lower body 14 are raised against the tension of coil spring 27, the movable body 14 is raised relative to the stationary body 13 (Fig. 3). Accordingly, the chamber 37 is contracted and the valve seat 42 is withdrawn from its engagement with the valve head 44 so that the outlet valve 46 is opened while the inlet valve 53 remains in a closed position to prevent entry of liquid from the tank 10 into the chamber 37 of the filling mechanism. As the lift plate 30 is further raised, and while the outlet valve 46 remains in open position, the inner shoulder 67 of the movable body 14 engages the lifting rods 61 and 62 (Fig. 3) and lifts the upper head 50 from the flange 15 (Fig. 4), whereby the inlet valve 53 is opened and the liquid is admitted from the tank 10 into the chamber 37 of the filling mechanism and is discharged therefrom through the outlet valve 46. Thus, the distance between the shoulder 67 and the lowermost extremities of the lifting rods 61 and 62, when valves 46 and 53 are closed, in conjunction with the rate of travel of the lifting plate 30, determines the interval of time during which the outlet valve is open before the inlet valve is opened. Likewise, the distance between the lowermost extremities of the stationary body 13 and the lift rods 61, 62, when valves 46 and 53 are closed, determine the extent of opening of the inlet valve, since this is the distance the inlet valve must be raised by the shoulder 67 before the shoulder contacts the fixed body. Since the valve head 50 is secured to the stem 43a, when the head 50 is lifted, the valve stem 43a and the lower valve head 44 are simultaneously lifted therewith. However, the outlet valve 46 remains fully open, since the body member 14 is raised at the same rate and simultaneously with the valve stem 43a. Conversely, when the lift plate 30 and body 14 are subsequently lowered, the upper valve head 50, the valve stem 43a and lower valve head 44 follow the rods 61, 62 downward until the valve head 50 is seated upon the flange 15 (Fig. 5). At this point, the upper valve is closed and the lower valve 46 remains open. During further downward movement of the lift plate 30, the bodies 13 and 14 are moved away from each other under the resiliency of coil spring 27, whereby the valve chamber 37 is expanded. The continuing downward movement of the lift plate 30 and the body 14, while the valve stem 43a and valve head 44 remain in their lowermost positions (Fig. 5), is finally arrested upon sealing engagement of the valve seat 42 with the lower valve head 44 under the force of coil spring 27.

Thus, the keying and lifting rods 61 and 62 raise the upper valve head 50 for opening the inlet valve 53, prevent rotation of the valve stem 43a by their engagement with the walls of the slots 59, 60 formed by both the stationary body 13 and the valve stem 43a, and serve as guide for the valve stem 43a during vertical movement of the same within the chamber 37.

In order to reduce valve foaming of the liquid, which enters the container 41, by releasing the air trapped within the container beneath the inflowing stream of liquid, the valve stem 43a is provided with a vertically disposed longitudinally extending vent passageway 68 (Fig. 2), which terminates in a tapered portion 69 within the outlet valve head 44. Communicating with the vent passageway 68 adjacent the lower valve head 44 are two radially extending ports 70 and 71 (Figs. 2 and 3), which communicate with the container 41 when the outlet valve 46 is in the open position, as shown in Fig. 3. A tapered plug 84 having a central aperture 85 is seated within the tapered portion 69 of the vent passageway 68. Fluid tight relationship is maintained between the plug 84 and the vent passageway 68 by an O-ring seal 79. Thus, the plug 84 prevents the dripping of liquid from the vent passageway 68 to the container 41, and consequently, any liquid in the vent passageway 68 can only be discharged through the radial ports 70 and 71, which can only occur when the valve 46 is opened. By preventing the dripping of liquid from the vent passageway 68, the filling mechanism 11 achieves greater uniformity and accuracy in filling the containers with liquid. The upper portion of the vent passageway 68 communicates with a vent tube 72, which has a threaded portion 73 secured to the wing nut 51 in contiguous relationship with the valve stem 43a. The vent tube 72 extends vertically upward into the tank 10 of the filling machine to a point above the liquid level therein (Fig. 1). Attached to the upper portion of the vent tube 72 is a splash cap 74, which prevents the splashing of liquid from the tank 10 into the vent tube 72.

When the outlet valve 46 is closed upon completion of the filling operation and the support 12 continues to lower, a partial vacuum is created in the head space of the container 41. For breaking this partial vacuum, an auxiliary or small bore capillary vent tube 75 (Fig. 5) is provided, which is centrally disposed within the vent passageway 68 and within the main vent tube 72 and extends longitudinally therein. The lowermost end of the vacuum releasing tube 75, which includes an opening 77 in communication with the head space of the container 41, is received by the aperture 85 of the plug 84. The vacuum releasing tube 75 communicates through its open upper end and through the vent tube 72 with the atmosphere above the liquid level in the tank 10. The auxiliary tube 75 is maintained in axial alignment within the vent passageway 68 and the vent tube 72 by frictional engagement with the tapered plug 84. Thus, the auxiliary vent tube 75 functions as an air vent during the early portion of the container filling operation and as a vacuum breaker at the end of the filling operation.

In the operation of the filling machine (Figs. 1–6), the tank 10, mechanism 11 and table 12 are continuously rotated about the vertical axis of the filling machine. The containers 41 are successively advanced to the container support 12. As soon as a container is received thereon, the support 12 is gradually and continuously raised from the position shown in Fig. 1 to the position shown in Fig. 2. During the upward movement of the container 41 from the position shown in Fig. 1 to the position illustrated in Fig. 2, the upper bead thereof is tightly pressed against the sealing gasket 31 of the lift plate 30 so that the gasket is indented and a liquid tight seal between the container 41 and the gasket 31 is established.

While the container is being elevated in this manner and brought into liquid tight engagement with the gasket 31, the inlet valve 53 and the outlet valve 46 are in closed position (Fig. 2) under the urgency of spring 27. As the upward movement of the container 41 continues from the position shown in Fig. 2 to the position illustrated in Fig. 3, the lift plate 30, and the body 14 are elevated against the force of coil spring 27, and the movable body 14 is raised relative to the stationary body 13. During the elevation of the body 14 from the position shown in Fig. 2 to the position illustrated in Fig. 3, the valve seat 42 is disengaged from the valve head 44. Accordingly, the outlet valve 46 is opened and the chamber 37 is contracted, while the inlet valve 53 remains in the closed position.

During further upward movement of the lift plate 30, the body 14, valve stem 43a, and the vent tube 72 from the position shown in Fig. 3 to the position shown in Fig. 4, the shoulder 67 of body 14 engages the lifting rods 61 and 62, whereby the valve head 50 is lifted from the flange 15 so that the inlet valve 53 is opened and communication between the liquid in tank 10 and the valve chamber 37 is established. As soon as the inlet valve 53 is opened, liquid flows from the tank 10 through the inlet port 38 into the chamber 37 and discharges through the outlet port 40 and outlet valve 46 into the container 41. The air in the container 41, displaced by the liquid discharged therein, flows to the atmosphere above the liquid in tank 10 over the following path: vent ports 70 and 71, vent passageway 68, vent tube 72 and splash cap 74 and also through the capillary vent tube 75. Thus in the filling operation, the foaming of the liquid which enters container 41 is reduced, since the air within the container beneath the inflowing stream of liquid has clear passage to and through the vent ports 70 and 71, the vent passageway 68 and the vent tube 72 and also through the auxiliary vent tube 75.

While both valves 53 and 46 are disposed in open position (Fig. 4), the liquid flows rapidly from the tank 10 through the filling mechanism 11 into the container 41 while the air is freely vented in the manner above described. The rapid flow of the liquid into the container 41 continues until the desired filling level is reached, which occurs when the liquid in the container 41 reaches the lowest end of the valve seat 42 which is the lower end of the outlet 40, as shown in Fig. 4. While the liquid level in the container remains at the lowest end of the outlet 40, the liquid rises into the vent passageway 68, the auxiliary tube 75, vent tube 72, to the level of the liquid in the tank 10 (Fig. 4). At this time, further flow of the liquid is arrested. Thereupon, the container support 12 and the container 41 supported thereby are lowered without container 41 losing contact with the sealing gasket 31 during the continuing cycle of operation of the filling machine. The lift plate 30, the body 14, valve stem 43a and vent tube 72 are likewise lowered under the action of coil spring 27 and the body 14 moves away from the body 13 effecting expansion of the chamber 37. While the body member 14 and the valve stem 43a are lowered, the valve head 50 engages the flange 15, whereby the inlet valve 53 is closed and the communication between the tank 10 and the chamber 37 is interrupted.

After the valve 53 has been closed and while the outlet valve 46 remains in open position, the body 14 continues its downward movement to create a suction by expanding the chamber 37, whereby liquid from the vent passageway 68 is drawn back into the container 41 and upwardly into the chamber 37. The chamber 37 is so dimensioned that its increase in volume, subsequent to the closing of valve 53, is adequate to draw a sufficient quantity of liquid out of the vent passageway 68 to permit the upper opening of the auxiliary vent tube 75 to project a suitable distance above the liquid level in the vent passageway 68 (Fig. 5).

During the continued downward movement of the body 14, the valve head 44 is engaged by the valve seat 42 and seats in liquid tight manner thereon so that the outlet valve 46 is now closed (Fig. 5), and the container 41 remains in sealing engagement with the yieldable gasket 31. When this occurs, the liquid level in the container 41 remains at the lower end of the outlet 40, which at this time is disposed at the same elevation as the lower end of the valve head 44 and at the level of the lower opening 77 of the auxiliary vent tube 75 (Fig. 5).

After the outlet valve 46 is closed and further downward movement of the lift plate 30 is arrested, the support 12 continues its downward movement to lower the container 41. The lowering of the container 41 permits the gasket 31 to yield and increases the volumetric capacity of the head space of the container 41, thereby creating a partial vacuum in the head space of the container. From the time the gasket 31 begins to yield and up to the time the gasket 31 has fully yielded, the container 41 travels a distance X (Fig. 5). Consequently, the liquid level of the container 41 is lowered in elevation a commensurate distance. Therefore, the liquid level of the container 41 drops below the lower end of valve head 44 and below the lower opening 77 of the auxiliary vent tube 75. At this time, the liquid in the auxiliary vent tube 75 flows from the lower opening 77 thereof into the container 41. Since the diameter of the capillary tube 75 is relatively small, the liquid discharged therefrom is inconsequential and does not affect the accuracy of the filling operation nor is it sufficient to raise the liquid level to the lower opening 77. After this occurs, air flows from the tank 10 through the auxiliary vent tube 75 to the space above the liquid level in the container 41 to break the vacuum in the head space of the container 41. When the container 41 is lowered from the position shown in Fig. 5 to the position illustrated in Fig. 6, the container 41 easily disengages itself from the gasket 31, since the vacuum in the head space of the container 41 is broken by the air flow through the vacuum breaking tube 75. The next cycle commences and is carried out in a similar manner as above described.

In Figs. 8, 9 and 10, a modified form of the vacuum release arrangement of the present invention is shown. The filling mechanism illustrated in Figs. 8, 9 and 10 is similar to the one shown in Figs. 1–7 with the exception that the auxiliary tube 75 of Figs. 1–7, inclusive, is replaced by a diaphragm valve 89. All parts in the modification of Figs. 8, 9 and 10 that are similar to parts in the filling mechanism of Figs. 1–7, inclusive, will be given like reference numerals followed by the suffix "a."

The diaphragm valve 89 (Figs. 8 and 9) comprises an annular sealing member 90 made of suitable material such as rubber, which is adapted for sealing engagement with the lower valve head flange 44a adjacent an opening 91 of the vent passageway 68a to close said opening, thereby providing a closed vent valve. For urging the sealing member 90 into sealing engagement, a thin resilient metal retaining member 93 is provided, which has an annular peripheral member 94 seated on a shoulder 95 on the lower valve head 44a to be supported thereby. An inner annulus 96 (Fig. 9) is connected to the outer annular member 94 by a strap 97 (Fig. 9) and is centrally disposed below the sealing member 90. A bolt 98 secures the inner annulus 96 to the sealing member 90. A spacer washer 99 is disposed between the retaining member 93 and the sealing member 90. Thus, the diaphragm valve 89 closes the inlet opening 91 of the vent passageway 68a and consequently any liquid in the vent passageway 68a can only be discharged through the radial ports 70a and 71a, and these ports are open only when the valve head 44a is moved off the seat 42a to open the outlet valve 46a.

When the inlet valve 53a and the outlet valve 46a are closed upon completion of the filling operation and the container support continues to lower, a partial vacuum is created in the head space of the container 41a. Consequently, the spring-like retaining member 93 yields to withdraw the sealing member 90 from sealing engagement with the valve head 44a. Liquid in the vent passageway 68a discharges into the head space of the container 41a to break the vacuum in the head space. After the partial vacuum is broken, the retaining member 93 again urges the sealing member 90 into sealing engagement to close the opening 91 of the vent passageway 68a.

It will be understood that modification and variations of the embodiments of the invention disclosed herein may be resorted to without departing from the spirit of the invention and the scope of the appended claims.

Having thus described my invention, what I claim as new and desire to protect by Letters Patent is:

1. In a filling mechanism, a stationary tubular valve body having a valve seat and longitudinally extending grooves in the inner wall thereof, a valve stem received by said stationary valve body and having longitudinally extending grooves at the outer edges thereof complementary with the grooves of said stationary valve body to form longitudinally extending keyways, a valve head carried by said valve stem and seated in sealing engagement on said valve seat, a plurality of lifting rods secured to said valve head, each rod being received by one of said keyways, a tubular valve body movable relative to said stationary valve body and having a portion thereof disposed under said lifting rods, and means for moving said movable valve body into engagement with said lifting rods to raise said rods for lifting said valve head from sealing engagement with said valve seat.

2. In a filling mechanism, a valve housing having relatively movable sections, each of said sections having a valve seat, a valve stem received by said housing and having thereon a plurality of valve heads, each head being mounted for movement toward and away from seating engagement on one of said valve seats, a plurality of lifting rods operatively connected to said valve stem and disposed in the path of movement of one of said sections for engagement by said one section, means for moving said one section toward said rods to engage and move said rods to lift said valve stem for raising said valve heads, and means defining complementary grooves in said stem and in the other of said sections receiving said lifting rods for guiding the lifting movement of said stem within said housing.

3. A filling mechanism for filling a container with liquid from a reservoir comprising a housing forming a chamber having an inlet passage for communicating with said reservoir and an outlet passage for communicating with a container disposed below said housing, a valve stem disposed within said chamber and extending longitudinally therethrough, means carried by said valve stem for controlling the flow of liquid through said inlet passage and said outlet passage, means defining a vent passageway extending through said valve stem in communication with the atmosphere and with said container for venting said container during the filling thereof, and a vacuum releasing tube carried by said valve stem in communication with the atmosphere and with said container for breaking a vacuum created in the head space of said container upon completion of the filling thereof.

4. A filling mechanism for filling a container with liquid from a reservoir comprising a housing forming a chamber having an inlet passage for communicating with said reservoir and an outlet passage for communicating with a container positioned below said housing, a valve stem disposed within said chamber and extending longitudinally therethrough, means carried by said valve stem for controlling the flow of liquid through said inlet passage and said outlet passage, means providing a vent passageway extending through said valve stem in communication with said reservoir and with said container for venting said container during the filling thereof, a vent closure disposed across the lower portion of said vent passageway and having an aperture therein, and a vacuum releasing tube movable with said valve stem and extending through said aperture to the interior of said container for breaking a vacuum created in the head space of said container upon completion of the filling thereof.

5. A filling mechanism for filling containers with liquid from a reservoir comprising a housing including relatively movable sections forming a chamber therewithin and having an inlet passage for admitting liquid from said reservoir to said chamber and an outlet passage for discharging the liquid from said chamber to a container sealed to said housing, means including a longitudinally disposed valve core cooperating with said inlet and outlet passages for sequentially opening and closing said inlet and outlet passages upon relative movement of said sections to control the admittance of liquid from said reservoir to said container, venting means extending through said valve core in communication with the atmosphere and with said container for venting said container upon the discharge of liquid thereinto, and a vacuum releasing tube disposed within said venting means so that the lower opening thereof is at the same elevation as the lowermost portion of said vent means, said vacuum releasing tube being in communication with the atmosphere of said reservoir and with said container for breaking a vacuum created in the head space of said container upon completion of the discharging of liquid into said container.

6. A filling mechanism for filling a container with liquid from a reservoir comprising a housing including relatively movable sections forming a chamber therewithin and having an inlet for admitting the liquid from the reservoir to the chamber and an outlet for discharging the liquid from the chamber into a container positioned below said housing, means including a longitudinally disposed valve core cooperating with said inlet and outlet for sequentially opening and closing said inlet and outlet upon relative movement of said sections to control the admittance of the liquid from the reservoir to the container, venting means extending through said core in communication with the atmosphere above the liquid level in said reservoir and with the head space of said container to release air from said container to the atmosphere above the liquid in said reservoir when said outlet is opened for discharging liquid into said container, and an auxiliary vent tube movable with said valve core and disposed within said vent means in communication with the atmosphere above the liquid in said reservoir and with the head space of said container for breaking the vacuum created in said head space upon the completion of the discharging of liquid into said container.

7. A filling mechanism for filling a container with liquid from a reservoir comprising a housing forming a chamber having an inlet for communicating with said reservoir and an outlet communicating with a container positioned below said housing, a valve stem disposed within said chamber and extending longitudinally therethrough, means carried by said valve stem for controlling the flow of liquid through said inlet and outlet, means providing a vent passageway extending through said valve stem and having an opening at the upper portion thereof communicating with the atmosphere and having radially extending ports at the lower portion thereof communicating with said container during the filling thereof, a vent closure fixedly secured to said vent passageway below said ports to stop liquid drip from said passageway to said container upon completion of the filling thereof, said vent closure having an aperture therethrough, and a vacuum releasing tube within said vent passageway movable with said valve stem and received by said aperture in sealing engagement with said closure and in communication with the head space in said container for breaking a vacuum created in the head space of said container after completion of the filling thereof.

8. A filling mechanism for filling containers with liquid from a reservoir comprising a housing including relatively movable sections forming a chamber therewithin and having an inlet for admitting liquid from the reservoir to the chamber and an outlet for discharging the liquid from the chamber to a container, said container being sealed to said housing by a yieldable gasket indented by engagement with said container, means including a longitudinally disposed valve core cooperating with said inlet and outlet for sequentially opening and closing said inlet and outlet upon relative movement of said sections to control the admittance of liquid from said reservoir to said container, venting means extending through said core in fixed relation thereto to communicate with the atmosphere and with said container for venting said container when said outlet is open to permit discharging of liquid into said container, said vent means having radially extending ports at the lower portion thereof in communication with said container when liquid is being discharged through said outlet into said container, a closure secured to said vent means in fixed sealing engagement therewith below said ports to stop dripping of liquid from said vent means into said container upon closure of said outlet, a vacuum releasing tube extending through said valve core in fixed relation thereto to communicate with the atmosphere and with the head space of said container, said vacuum releasing tube being so disposed and arranged in said core relative to the outlet that upon closure of said outlet the liquid in said container is in contact with the lower opening of the tube while said gasket is indented, and upon further lowering of said container to permit said gasket to yield, the liquid level of said container drops below the lower opening of said vacuum releasing tube thereby establishing communication between the head space of said container and the atmosphere for breaking a vacuum created in the head space of said container subsequent to the completion of the filling operation.

9. A filling mechanism for filling a container with liquid from a reservoir comprising a housing forming a chamber having an inlet for communicating with said reservoir and an outlet for communicating with a container positioned below the outlet, a valve stem disposed within said chamber and extending longitudinally therethrough, means carried by said valve stem for controlling the flow of liquid through said inlet and said outlet, means defining a vent passageway through said valve stem in communication with said reservoir and with said container for venting said container when said outlet is open to permit the discharge of liquid into the container, and a resilient diaphragm valve carried by said valve stem and disposed in sealing engagement with the lowermost portion of said vent means to stop the dripping of liquid from said vent passageway into said container upon closure of said outlet, the resiliency of said diaphragm valve being such that said valve will move out of sealing engagement with said vent means in response to a vacuum created in the head space of said container after completion of the filling thereof whereby to break the vacuum in the head space of said container.

10. A filling mechanism for filling a container with liquid from a reservoir comprising a housing forming a chamber having an inlet for communicating with said reservoir and an outlet for communicating with a container positioned below said outlet, a valve stem disposed within said chamber and extending longitudinally therethrough, means carried by said valve stem for controlling the flow of liquid through said inlet and said outlet, means defining a vent passageway extending through said valve stem in communication with said reservoir and said container for venting said container when liquid is being discharged through said outlet, a sealing member positioned in sealing engagement with the lowermost portion of said vent passageway to stop the dripping of liquid from said vent passageway into said container upon closure of said outlet, and a resilient retaining member carried by said valve stem and connected to said sealing member to bias said member into sealing engagement with said vent means to close said passageway, said retaining member having a resiliency adapting it to yield in response to a vacuum created in the head space of said container upon completion of the filling thereof to remove said sealing member from sealing engagement with said vent means to break the vacuum in the head space of said container.

11. In a container filling mechanism of the type having a valve housing, a valve in the housing movable between an open and a closed position, means for moving a container into sealed engagement with the housing, and a primary vent carried by the valve and being open for establishing communication between the container and the atmosphere when the valve is open and being closed to terminate venting therethrough when said valve is closed, the improvement which comprises a secondary vent of smaller size than said primary vent carried by the valve and being open for venting the head space of the container to the atmosphere when the valve is closed.

References Cited in the file of this patent

UNITED STATES PATENTS

| | | |
|---|---|---|
| 2,679,347 | Franz | May 25, 1954 |
| 2,761,607 | Ayars | Sept. 4, 1956 |

FOREIGN PATENTS

| | | |
|---|---|---|
| 527,920 | Germany | June 23, 1931 |